P. McDuff,
Fence Post,
Nº 77,066. Patented Apr. 21, 1868.
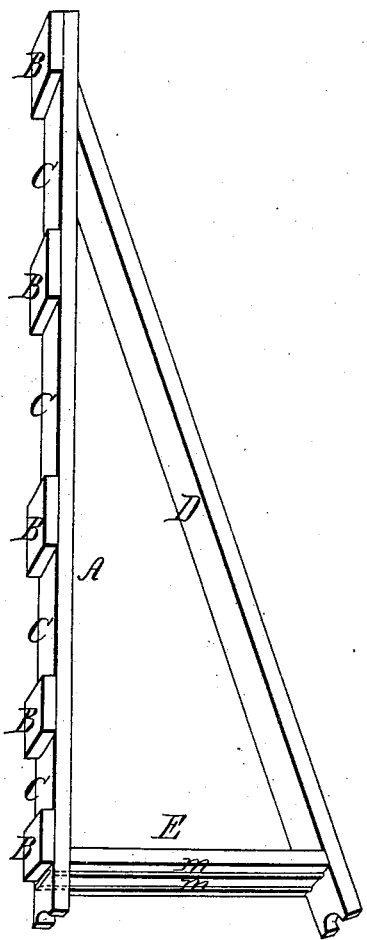
Witnesses
W. C. Ashkettle
Theo Tusche
Inventor
P. McDuff
per Munn & Co
Attorneys

United States Patent Office.

P. McDUFF, OF ATCHISON, KANSAS.

Letters Patent No. 77,066, dated April 21, 1868.

IMPROVEMENT IN FENCE-POST.

*The Schedule referred to in these Letters Patent and making part of the same.*

TO ALL WHOM IT MAY CONCERN:

Be it known that I, P. McDuff, of Atchison, in the county of Atchison, and State of Kansas, have invented a new and Improved Fence-Post; and I do hereby declare that the following is a full, clear, and exact description thereof, which will enable those skilled in the art to make and use the same, reference being had to the accompaying drawings forming part of this specification.

This invention relates to an improvement in fences, and consists of an upright plank, secured to a bottom cross-piece and brace, and having the horizontal planks composing the fence-panels nailed to the upright plank.

The drawing shows a perspective view of my invention, and in which—

A is the upright plank.

B, the fence-planks nailed to the same.

C, the space between the planks.

D is the brace, which is fastened to the top of the upright plank by clenched nails through its bevelled end, as shown.

The upright plank and the brace are secured at their bottom ends to a cross-piece, E, by a wire link, $m$, which passes through holes in the said upright plank and brace, as shown. The wire is twisted or locked on the outside of the brace.

The wire serves to clamp the posts firmly together, and thus obtain a durable post-frame. By making the upright plank of ordinary thickness, common nails can be used, and clinched to secure the planks to the uprights. In setting up this post-frame, the cross-piece E can be loaded with stones, piled around and above it, thus holding the post securely, or the same may be held by stakes driven in the ground and nailed to the post-frame.

I am aware that post-frames have been made having a triangular shape similar to mine, but they were generally built of square timber, and provided with some device other than nails for securing the fence-planks. Plank or board frames also have been used, but the boards were placed edgewise to the fence-planks, and in none of such post-frames above alluded to was the clinching of the nails on the uprights contemplated or possible.

In my improved method of construction I place the boards composing the frame flatwise to the fence-planks or board, and secure the latter to the upright with clinched nails.

I also more firmly clamp the lower ends of the parts by means of the wire, $m$, as aforesaid, and thus produce a post-frame for fences that has greater security and durability than as heretofore made.

If desired, cleats, like the sections of fence-plank shown at B, can be nailed permanently to the upright, and the fence-planks set into the recesses thus formed, as shown at C, and fastened by an exterior batten nailed to the upright. In this modification the fence-planks or boards can be used at any part of the enclosure as bars, and let down, or they may be permanently fastened by nails through them.

This improved fence-post thus is available in more than one manner, and being simple, and of small cost, is likely to meet with favor from all interested.

I claim as new, and desire to secure by Letters Patent—

The triangular fence-post, constructed as described, consisting of the upright, A, having cleats B, the inclined brace D, short cross-piece E, and wire, $m$, as shown and described, for the purpose specified.

P. McDUFF.

Witnesses:
R. P. R. MILLOS,
JOHN C. BIRD.